United States Patent
Iyer et al.

(10) Patent No.: US 10,628,342 B1
(45) Date of Patent: Apr. 21, 2020

(54) SYSTEM AND METHOD FOR ACCELERATING PERFORMANCE OF NON-VOLATILE MEMORY RAID STACKS

(71) Applicant: DELL PRODUCTS, LP, Round Rock, TX (US)

(72) Inventors: Shyamkumar T. Iyer, Austin, TX (US); Srikrishna Ramaswamy, Austin, TX (US); Anirban Kundu, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/228,566

(22) Filed: Dec. 20, 2018

(51) Int. Cl.
*G06F 13/16* (2006.01)
*G06F 13/42* (2006.01)
*G06F 12/10* (2016.01)

(52) U.S. Cl.
CPC .......... *G06F 13/1668* (2013.01); *G06F 12/10* (2013.01); *G06F 13/4282* (2013.01); *G06F 2212/1044* (2013.01); *G06F 2212/657* (2013.01); *G06F 2213/0026* (2013.01)

(58) Field of Classification Search
CPC .. G06F 13/1668; G06F 13/4282; G06F 12/10; G06F 2212/1044; G06F 2212/657; G06F 2213/0026
See application file for complete search history.

(56) References Cited

U.S. PATENT DOCUMENTS

| | | | |
|---|---|---|---|
| 6,182,177 B1* | 1/2001 | Harriman | G06F 13/18 710/112 |
| 10,235,195 B2 | 3/2019 | Iyer et al. | |
| 10,261,698 B2 | 4/2019 | Ramaswamy et al. | |
| 10,261,699 B2 | 4/2019 | Ramaswamy et al. | |
| 2010/0082879 A1* | 4/2010 | McKean | G06F 3/0611 711/103 |
| 2012/0069029 A1* | 3/2012 | Bourd | G06F 9/546 345/502 |
| 2015/0026313 A1* | 1/2015 | Chawla | H04L 47/24 709/220 |
| 2018/0088978 A1* | 3/2018 | Li | G06F 9/45558 |
| 2018/0189225 A1 | 7/2018 | Ramaswamy et al. | |

* cited by examiner

*Primary Examiner* — Henry Tsai
*Assistant Examiner* — John B Roche
(74) *Attorney, Agent, or Firm* — Larson Newman, LLP

(57) ABSTRACT

An information handling system includes an accelerator that advertises, via a single peripheral component interconnect express endpoint, to a processor a plurality of queues from different drives. The processor writes commands and maps each command to target a particular one of the queues. The accelerator performs a queue level logical separation for the mapped command to be processed by the target queue.

20 Claims, 5 Drawing Sheets

SYSTEM AND METHOD FOR ACCELERATING PERFORMANCE OF NON-VOLATILE MEMORY RAID STACKS

CROSS REFERENCE TO RELATED APPLICATIONS

Related subject matter is contained in co-pending U.S. patent application Ser. No. 16/227,710 entitled "Apparatus and Method for Reducing Latency of Input/Output Transactions in an Information Handling System using No-Response Commands," filed of even date herewith, the disclosure of which is hereby incorporated by reference.

Related subject matter is contained in co-pending U.S. patent application Ser. No. 16/228,571 entitled "System and Method of Improving Efficiency in Parallel Data Processing of a RAID Array," filed of even date herewith, the disclosure of which is hereby incorporated by reference.

FIELD OF THE DISCLOSURE

This disclosure generally relates to information handling systems, and more particularly relates to accelerating the performance of non-volatile memory express (NVMe) redundant array of independent drives (RAID) stacks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include an accelerator that advertises, via a single peripheral component interconnect express endpoint, to a processor a plurality of queues from different drives. The processor writes commands and maps each command to target a particular one of the queues. The accelerator performs a queue level logical separation for the mapped command to be processed by the target queue.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
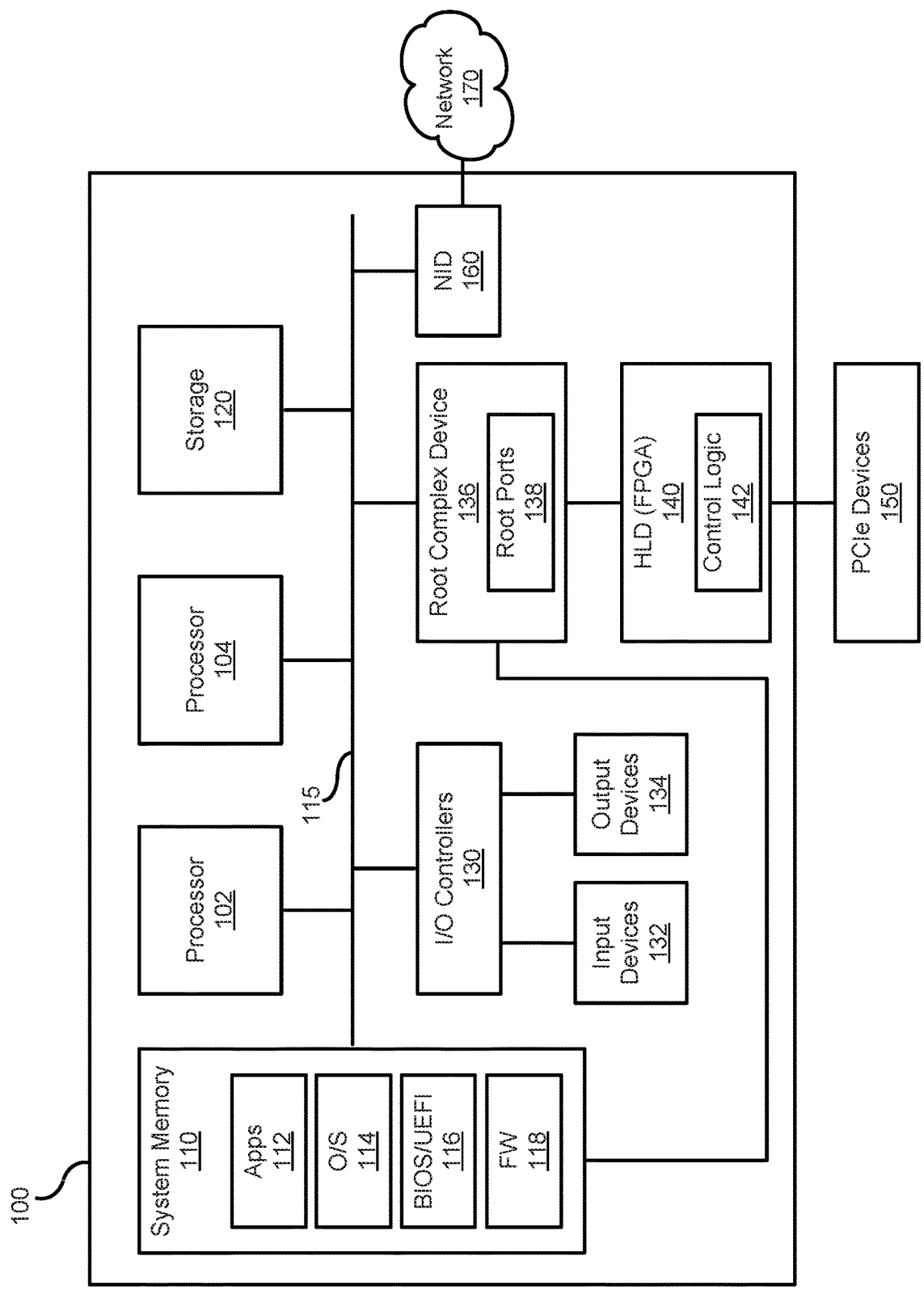
FIG. 1 is a block diagram of an information handling system configured to communicate with peripheral component interconnect express (PCIe) devices, according to an embodiment of the present disclosure.

FIG. 1 illustrates an information handling system (IHS) 100, within which one or more of the described features of the various embodiments of the disclosure can be implemented. For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display.

Information handling system can also include one or more buses operable to transmit information between the various hardware components.

The IHS 100 includes one or more processors, such as processors 102 and 104, coupled to system memory 110 via system interconnect or bus 115. Also coupled to system interconnect 115 is storage 120 within which can be stored one or more software and/or firmware modules and/or data. In one embodiment, the storage 120 can be a hard drive or a solid state drive. Modules within the storage 120 can be loaded into system memory 110 during operation of the IHS 100. As shown, system memory 110 can include multiple software and/or firmware modules including application(s) 112, operating system (OS) 114, basic input output system/ unified extensible firmware interface (BIOS/UEFI) 116 and firmware (FW) 118. In one or more embodiments, BIOS/ UEFI 116 includes the additional functionality associated with UEFI and can include UEFI images and drivers. The various software and/or firmware modules have varying functionality when their corresponding program code is executed by processors 102 and/or 104 or other processing devices within IHS 100.

IHS 100 further includes one or more I/O controllers 130 which support connection by, and processing of signals from, one or more connected input device(s) 132 such as a keyboard, mouse, touch screen, or microphone. I/O controllers 130 also support connection to and forwarding of output signals to one or more connected output devices 134, such as a monitor, display device or audio speaker(s).

IHS 100 further includes a root complex device 136 that is coupled to the system interconnect 115 and system memory 110. The IHS 100 further includes a hardware logic device (HLD) or inline accelerator such as a field programmable gate array (FPGA) 140. In other embodiments, the HLD may be an application specific integrated circuit (ASIC) or other type of integrated circuits (IC). Root complex device 136 has several root ports 138. Root complex device 136 is coupled to FPGA 140, and also connects the processor 102 and system memory 110 to a peripheral component interconnect express (PCIe) fabric. Root complex device 136 can support several PCIe root ports 138. The root ports are connected to an endpoint device via FPGA 140. Root complex device 136 generates transaction requests for processor 102, transmits packets through root ports 138, and receives packets from root ports 138. The received packets are then forwarded to system memory 110 or processor 102.

FPGA 140 supports connection to and processing of signals from two or more connected PCIe devices 150. FPGA 140 includes hardware control logic 142 that can perform one of more of the methods described herein. In one embodiment, PCIe device(s) 150 can include graphic processing units and storage devices that are connected via a PCIe endpoint. Storage devices may include solid state drives, such as non-volatile memory express (NVMe) devices. FPGA 140 is coupled to root complex device 136. FPGA 140 supports transmission of data to and from PCI devices 150.

In an embodiment, each PCIe device corresponds to a PCIe drive and the PCIe device is interchangeably hereinafter referred to as the PCIe drive. Furthermore, each PCIe drive may support at least one queue that may process a command written by the processor. In this embodiment, a total of "n" number of queues across the PCIe devices may be advertised by the FPGA 140 to the processor 102 where "n" is an integer number.

IHS 100 further includes a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. Network 170 is indicated as a single collective component for simplicity. However, it is appreciated that network 170 can include one or more direct connections to other devices as well as a more complex set of interconnections as can exist within a wide area network, such as the Internet.

Figure 2:
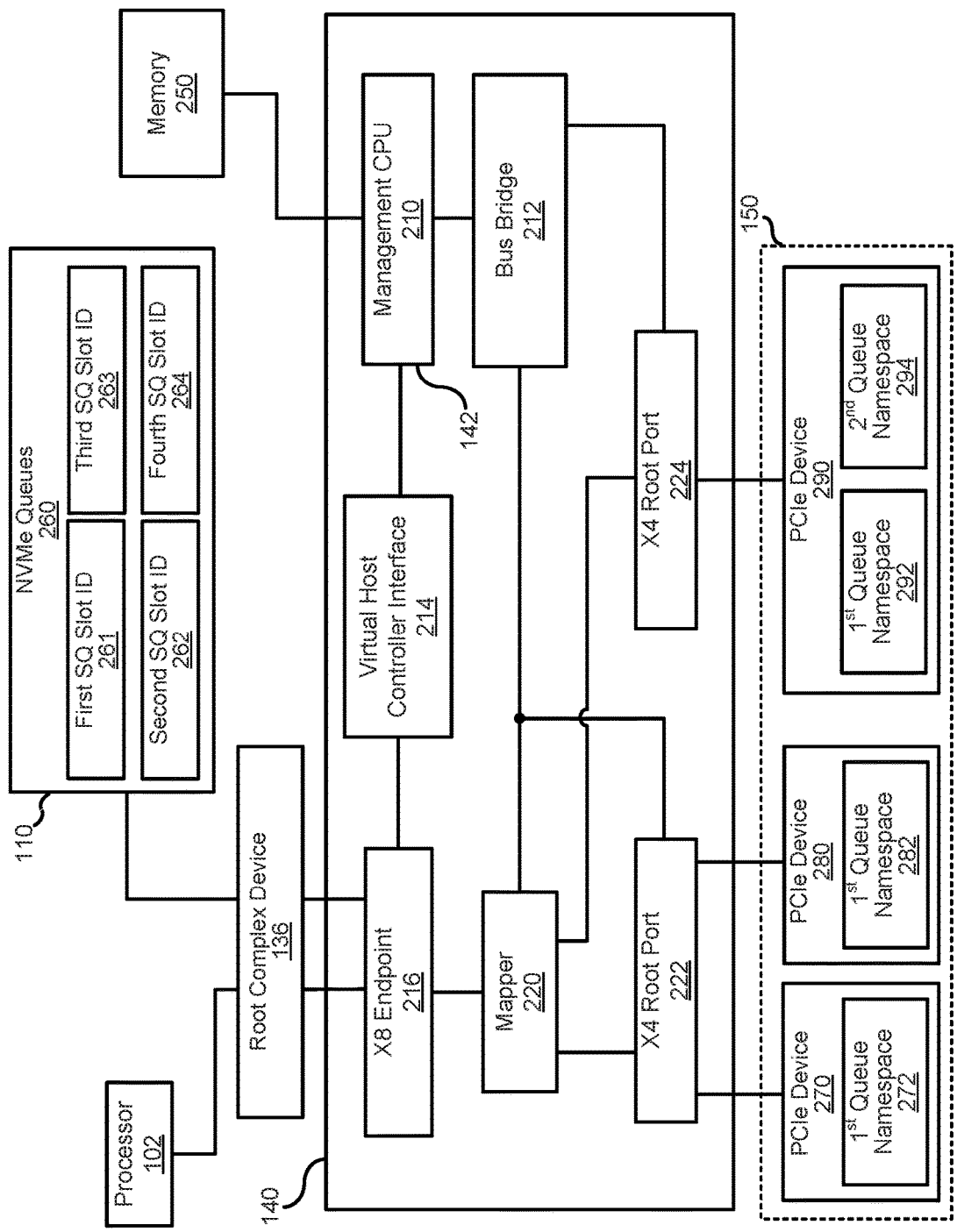
FIG. 2 is a block diagram of a field programmable gate array (FPGA) that facilitates latency reduction during an input/output (I/O) transaction between a processor and devices, according to an embodiment of the present disclosure.

FIG. 2 shows a block diagram of the FPGA 140 that facilitates a latency reduction in the IHS. The FPGA may be configured to advertise the "n" number of queues to the processor via multiple PCIe endpoints. In return, the processor may use different endpoints when writing commands to target the different PCIe drives; however, the use of the multiple endpoints for targeting the different drives increases the latency in the I/0 operations of the IHS.

In an embodiment, the FPGA is configured to use a single PCIe endpoint to advertise the "n" number of queues even though the advertised queues are distributed to more than one PCIe drive. In other words, the FPGA is aware that the advertised queues may include namespace addresses that are logically different from one another and yet the FPGA advertises them as one set of "n" queues to the processor. In this embodiment, the processor sees the single PCIe endpoint and writes "n" number of commands in submission queue slots where each command is directed to a particular queue in a particular PCIe drive. The processor utilizes the namespace addresses to map each command to target the particular queue in the particular drive. At the FPGA side, however, this mapping of commands may require queue level logical separations to make sure that the right PCIe drive is processing the mapped command.

For example, the processor writes "n" number of commands that are mapped to target the advertised queues. However, the command may be written in a submission queue slot with a register address that does not correspond to a namespace address, which includes a logical address of the target queue. The submission queue slot is a circular buffer with a fixed slot size that the host software uses to submit the NVMe command or commands. In this example, the FPGA is configured to shift the register address of the submission queue slot (where the command is written) to the namespace address of the target queue during downstream PCIe transactions. This queue level logical separation is implemented due to the use of the single PCIe endpoint in the advertising of the queues. The processor perceives the single PCIe endpoint and receives queue namespace addresses, but the processor is not aware of the logically separated configurations of the queues that correspond to the namespace addresses. In an embodiment, the FPGA is configured as an intelligent router by observing the queue logical separation when sending signals from the single PCIe endpoint to the target queues. In this embodiment, the FPGA acts as a host to the queues.

In an embodiment, the FPGA 140 is configured as an inline accelerator that utilizes the control logic 142 to control I/O operations of the FPGA 140. The control logic 142 includes a management CPU 210 that is communicatively coupled to a bus bridge 212 and to the FPGA random access memory (RAM) virtual host controller interface 214. FPGA RAM virtual host controller interface 214 is communicatively coupled to a host virtual endpoint 216. Management CPU 210 is further coupled to an external memory 250. Host virtual endpoint 216 is coupled to root complex device 136, which is coupled to processor 102 and system memory 110. In one embodiment, system memory 110 can store NVMe queues 260 that may include NVMe commands. Each NVMe command may be written and stored in a first submission queue slot identification (SQ slot ID) 261, a second SQ slot ID 262, a third SQ slot ID 263, or a fourth SQ slot ID 264. Host virtual endpoint 216 is a pseudo endpoint for the processor 102. In an embodiment, the host virtual endpoint 216 is configured as the single PCIe endpoint that advertises the "n" number of queues where n=4 in the illustrated embodiment. In this embodiment, the processor is aware that it can write four commands in different submission queue slots and the processor can map each command to target a specific queue of a specific drive. This mapping of commands, however, requires queue level logical separation that is implemented by a mapper 220 or the management CPU 210.

The host virtual endpoint 216 is further coupled to the mapper 220 that may be configured to facilitate downstream PCIe transactions to PCIe devices 270, 280, and 290. The mapper 220 is also configured to facilitate upstream PCIe transactions to the processor or system memory. For example, the mapper 220 may act as a doorbell mapper, command fetch mapper, queue mapper with regard to a command response from the system memory, and a completion mapper for the PCIe devices.

Mapper 220 is coupled to the bus bridge 212 and to root ports 222 and 224. Each of the root ports 222 and 224 is further coupled to bus bridge 212. Root port 222 is also coupled to PCIe devices 270 and 280, and root port 224 is also coupled to PCIe device 290. In another embodiment, the FPGA 140 utilizes a single root port rather than multiple root ports, such as the root ports 222 and 224. In this other embodiment, the single root port may include a switching topology that facilitates selection of the PCIe device that transacts with the processor or the system memory through the host virtual end point 216. For example, the single root port is a sixteen lane root port. In this example, the single root port may support multiple PCIe devices behind the single virtual end point 216.

During data transmission between the processor 102 and the PCIe devices 270, 280, and 290, the mapper 220 as a hardware logic may be configured to implement the logical separation of mapped commands between the host virtual endpoint 216 and the queues. In another embodiment, the management CPU 210 may also be used to implement the logical separation of the mapped commands. In this other embodiment, the management CPU 210 is aware that the queues may be logically separated from one another. By using the single PCIe endpoint to advertise these queues and their corresponding namespaces, the processor sees the single PCIe endpoint and configures the mapping of commands based on the namespaces and not from the logical separation of the queues. In this regard, the management CPU 210 acts as the host to the logically separated queues and observes proper attributes of each mapped command so that the desired destinations during upstream and downstream PCIe transactions are properly followed.

PCIe device 270 supports a first queue namespace 272, the PCIe device 280 supports a first queue namespace 282, and the PCIe device 290 supports a first queue namespace 292 and a second queue namespace 294. Each of these namespaces represents an advertised queue. The first queue namespace 272, for example, is a namespace that is associated with the single queue that is supported by the PCIe device 270. In this example, a namespace label describes the attributes of this associated namespace. The attributes may include a physical address of the PCIe device that supports the queue, namespace address of the queue, range of logical block addresses of the queue, number of queue or queues that are supported by the PCIe device, and the like. The rest of the queue namespaces 282, 292, and 294 are similarly treated as namespaces that are associated with the corresponding queues that are supported by the corresponding PCIe devices. In one embodiment, PCIe devices 270, 280, and 290 can be NVMe devices that are used in a redundant array of independent drives (RAID). In other embodiments, the PCIe devices can be graphics processing units or remote direct memory access network interface cards that interact with the processor or system memory through the single PCIe end point.

In an embodiment, the FPGA 140 exposes or advertises four queues (n=4) to the processor 102 through the host virtual endpoint 216 as the single PCIe endpoint. The advertising includes sending the namespaces of the corresponding queues to the processor 102. The advertised four queues are distributed across the PCIe devices that are coupled to the FPGA. The coupled PCIe devices are in physical communication with the processor and are expected to work on the one or more commands that are stored in the NVMe queues of the system memory 110. In this embodiment, the processor 102 acknowledges the advertised four queues but it perceives them only up to the single host virtual endpoint of the FPGA 140. Beyond the host virtual endpoint, the FPGA may act as the host to the coupled PCIe devices in such a way that it implements the queue level logical separation of the target queues to receive the mapped commands.

For example, the PCIe devices 270, 280, and 290 are coupled to the FPGA 140 through the root ports 222 and 224. Each of the PCIe devices 270 and 280 supports a single queue while the PCIe device 290 supports two queues in the illustrated embodiment. Each of these four queues may be identified through their associated namespaces. In this example, the FPGA 140 may advertise the four queues and their corresponding namespaces to the processor 102 through the single host virtual endpoint 216. Based on the advertised namespaces, the processor 102 may write four commands and map each command to target a particular queue in a particular drive.

In an embodiment, the processor 102 may sequentially write command(s) on each of four submission queue slots where each command is directed to a particular queue of a particular drive. For example, processor 102 initially writes a first command in the first SQ slot ID 261. In this example, the first command is directed to the first queue namespace 272 of the PCIe device 270.

After writing and storing of the first command in the NVMe queues 260, the processor 102 sends a doorbell to the PCIe device 270 that supports the first queue in the advertised four queues. The doorbell indicates the presence of the new command in the first submission queue slot of the system memory 110. At this stage, the register address of the first SQ slot ID 261 matches the namespace address of the first queue namespace 272. That is, the first queue in the first drive corresponds to the first submission queue slot of the NVMe command queues 260. In this regard, the mapper 220 or the management CPU 210 is not doing any queue level logical separation or register address modifications on the upstream and downstream PCIe transactions between the system memory or processor and the first PCIe device 270. The mapper 220 may merely facilitate the sending of the doorbell downstream to the PCIe device 270, facilitate the forwarding of the command fetch from the PCIe device 270 to the system memory, relay a command response from the system memory to the PCIe device 270, and send the completion status from the PCIe device 270 to the processor.

However, when the processor 102 writes a second command to the second submission queue slot, and the second command is directed to the first queue namespace 282 of the second drive, the register address of the second SQ slot ID 262 may be different from the namespace address of the first queue namespace 282. In an embodiment, the processor 102 writes the second command based on the first queue namespace 282 that was presented by the FPGA using the single PCIe endpoint. Beyond the PCIe endpoint, however, the processor is not aware that the first queue namespace 282 of the second drive is actually separated logically from the first queue namespace 272 of the first drive. From the point of view of the first queue namespace 272 and the first queue namespace 282, each queue will be receiving a command from the first submission queue slot of the NVMe queues 260. Because the written second command is coming from the second submission queue slot and not from the first submission queue slot, then the register address of the second SQ slot ID 262 may be adjusted to match the logical address of the first queue namespace 282. In an embodiment, the FPGA makes sure that it implements the queue level logical separation in order for the second command to reach the first submission queue slot of the second drive. Similarly, during upstream PCIe transaction, the FPGA makes sure that the attributes of the response from the first submission queue slot of the second drive correspond to the attributes of the second command in the second submission slot. The FPGA is acting as the host to the first queue namespace 282 of the second drive in this regard.

For example, processor 102 sends a doorbell to the PCIe device 280 to indicate the presence of the second command in the second SQ slot ID 262. In this example, a register pointer for the doorbell corresponds to the register address of the second SQ slot ID 262. In a preferred embodiment, the mapper 220 is configured to receive or intercept the doorbell and determine whether the register address of the second SQ slot ID 262 is supported by the targeted drive. In this embodiment, the mapper 220 is aware that the PCIe device 280 is supporting a single queue that is logically separated from the single queue of the first drive—PCIe device 270. As such, from the point of view of the single queue of the second drive—PCIe device 280, it is expecting the doorbell to indicate the command from the first submission queue slot and not the command from the second, third, or fourth submission queue slot. In an embodiment, the mapper 220 is configured to modify the register address of doorbell for the second SQ slot ID 262 to match the logical address of the targeted queue. Thereafter, the mapper 220 may allow the doorbell coming from the host virtual endpoint 216 to pass the root port 222 and be received by the PCIe device 280. The mapper 220 in this case may act as the doorbell mapper. In another embodiment, the management CPU 210 may be configured to modify the register address of doorbell for the second SQ slot ID 262 to match the logical address of the targeted queue. In this other embodiment, the management CPU 210 may control data flow between processor or system memory, and the PCIe devices.

In response to the receiving of the doorbell, the PCIe device 280 sends a command fetch to the system memory 110. However, because the PCIe device 280 is only supporting a single queue, the PCIe device 280 expects that it will be sending the command fetch to the first SQ slot ID 261 of the system memory 110. In an embodiment, the mapper 220 is configured to intercept the command fetch from the PCIe device 280 and to adjust the command fetch attributes to correspond with the address of the second submission queue slot—SQ slot ID 262. In this embodiment, the mapper 220 implements the sending of the command fetch to the second SQ slot ID 262 of the system memory 110. The mapper 220 in this case may act as the command fetch mapper. In another embodiment, the management CPU 210 may be configured to adjust the command fetch attributes to correspond with the address of the second submission queue slot—SQ slot ID 262.

In response to the received command fetch from the FPGA 140, the system memory 110 sends a command response that includes the second command that was stored in the second SQ slot ID 262. Again, the mapper 220 receives or intercepts the command response and performs the same logical separation operation in order for the command response to be received by the PCIe device 280. The mapper 220 in this case may act as the command response mapper.

After completion of the second command from the second SQ slot ID 262, the completion status from the PCIe device 280 is intercepted by the mapper 220 to make sure that the attributes of the second command are observed. The mapper 220 in this case may act as the completion status mapper. That is, the mapper 220 is configured to send the completion status from the PCIe device 280 to a second completion queue of the second SQ slot ID 262. The PCIe device 280 perceives that it is sending the completion status to the completion queue of the first SQ slot ID 261; however, on account of the logical separation due to the use of the single PCIe endpoint, the mapper 220 makes sure that the attributes of the second command are observed.

In an embodiment, the processor 102 writes the third and fourth commands in SQ slot IDs 263-264, respectively. These two commands are directed to the PCIe device 290. In this embodiment, the register addresses of the SQ slot IDs 263-264 do not conform to the namespace addresses of the queues in the PCIe device 290. The PCIe device 290 supports only two queues and it is expecting commands to be coming from the first SQ slot 261, and the second SQ slot 262 of the system memory. In this regard, the mapper 220 may perform queue level logical separations during sending of the doorbells, forwarding of the command fetch, relaying of the command response, and sending of the completion status.

Accordingly, by using the single PCIe endpoint to advertise the queues, the FPGA facilitates reduction in latency by acting as an intelligent router to the target drives.

Figure 3:
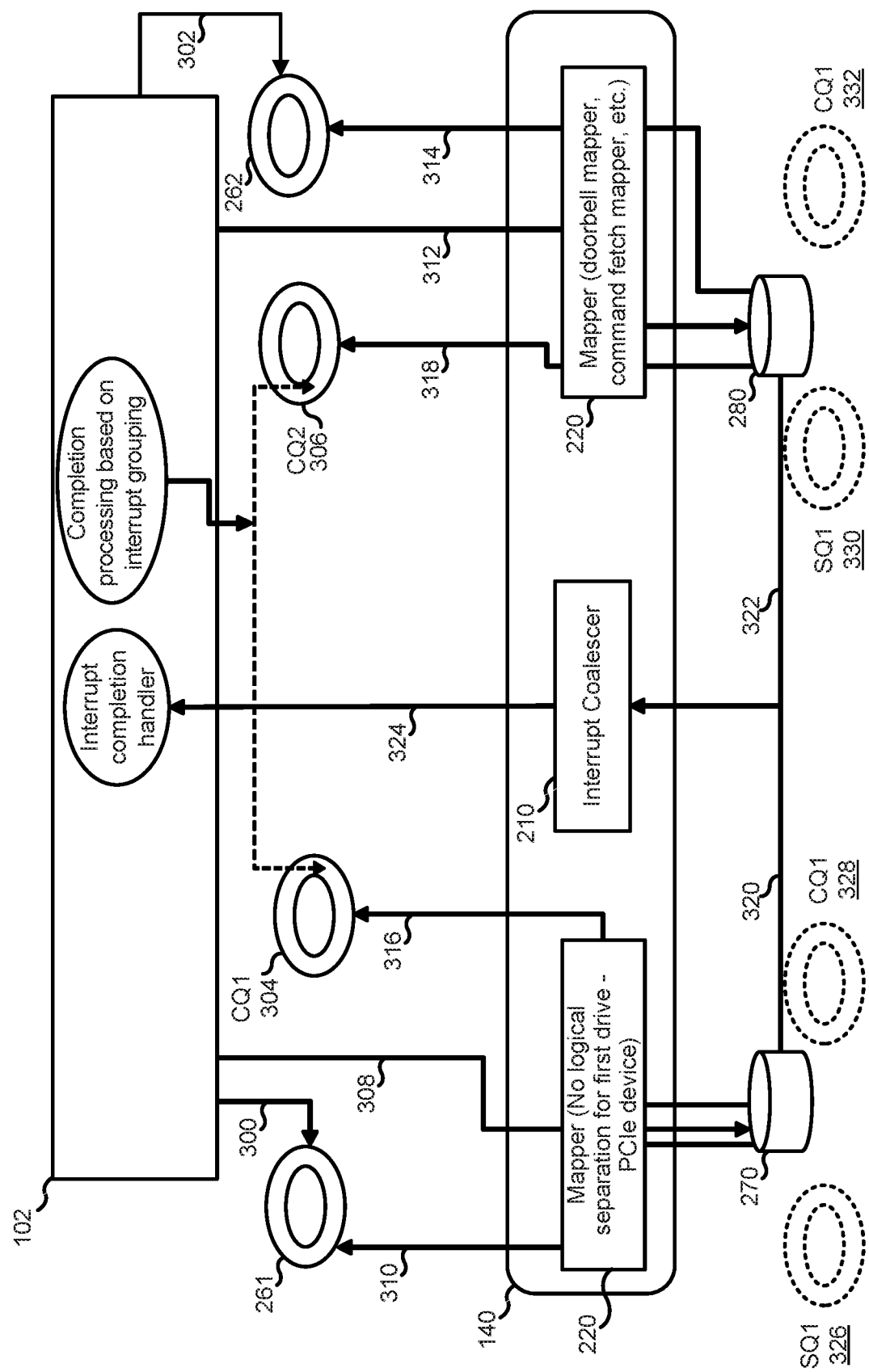
FIG. 3 is a sequence diagram of a method for implementing queue level logical separation, according to an embodiment of the present disclosure.

FIG. 3 shows an example queue level logical separation by the FPGA to observe proper attributes of the mapped commands. In an embodiment, the FPGA 140 advertises the two queues to the processor using the single PCIe endpoint. In this embodiment, the processor 102 queues 300 the first command in the first SQ slot ID 261. Processor 102 also queues 302 the second command in the second SQ slot ID 262. The SQ slot IDs 261 and 262 are paired with a first completion queue (CQ1) 304 and a second completion queue (CQ2) 306, respectively.

Processor 102 sends 308 a doorbell for the first command, and in return the PCIe device 270 sends 310 a command fetch to the first SQ slot ID 261 of the system memory. In an embodiment, the FPGA 140 ensures that the command fetch attributes match the queue ID, attributes of the mapped command, and other attributes that are expected by the first PCIe device 270. For example, the FPGA routes the doorbell to the PCIe device 270 and makes sure that the command fetch is directed to the first SQ slot ID 261. In this embodiment, the FPGA ensures inline acceleration at wire speeds.

Processor 102 similarly sends 312 the doorbell for the second command, and in response the second drive—PCIe device 280 sends 314 the command fetch to the second SQ slot ID 262. In an embodiment, the FPGA 140 ensures that the command fetch attributes match the attributes of the mapped second command and other attributes that are expected by the PCIe device. In this case, the PCIe device 280 is expecting the first command in the first SQ slot ID 261; however, the FPGA is configured to perform the queue logical separation by making the necessary modifications in the register address as described. For example, the FPGA routes the doorbell to the PCIe device 280, and makes sure that the command fetch from the PCIe device 280 is directed to the second SQ slot ID 262. In this embodiment, the FPGA ensures inline acceleration at wire speeds.

The PCIe device 270 completes the first command and sends 316 the completion status to the CQ1 304. The PCIe device 280 similarly completes the second command and sends 318 the completion status to the CQ 306. The sending 318 undergoes the logical separation while the sending 316 does not because the attributes of the sending 316 match the attributes of the first command. The PCIe device further sends 320 the interrupt to notify the CQ1 status update. PCIe device also sends 322 the interrupt to notify the CQ2 status update. In an embodiment, the management CPU 210 is configured to squelch redundant interrupts and sends 324 a single interrupt to the processor 102.

In an embodiment, the PCIe device 270 includes a submission queue slot 326 and a completion queue 328 for the supported single queue—namespace 272. Similarly, the PCIe device 280 includes a submission queue slot 330 and a completion queue 332 for the supported single queue—namespace 282. In this embodiment, the PCIe device 280 expects that the doorbell and command response that it receives are coming from the first submission queue slot of the system memory 110.

Accordingly, the FPGA 140 facilitates the queue logical separation to make sure that proper attributes of the mapped commands are implemented to improve latency during the I/0 operations of the IHS.

Figure 4:
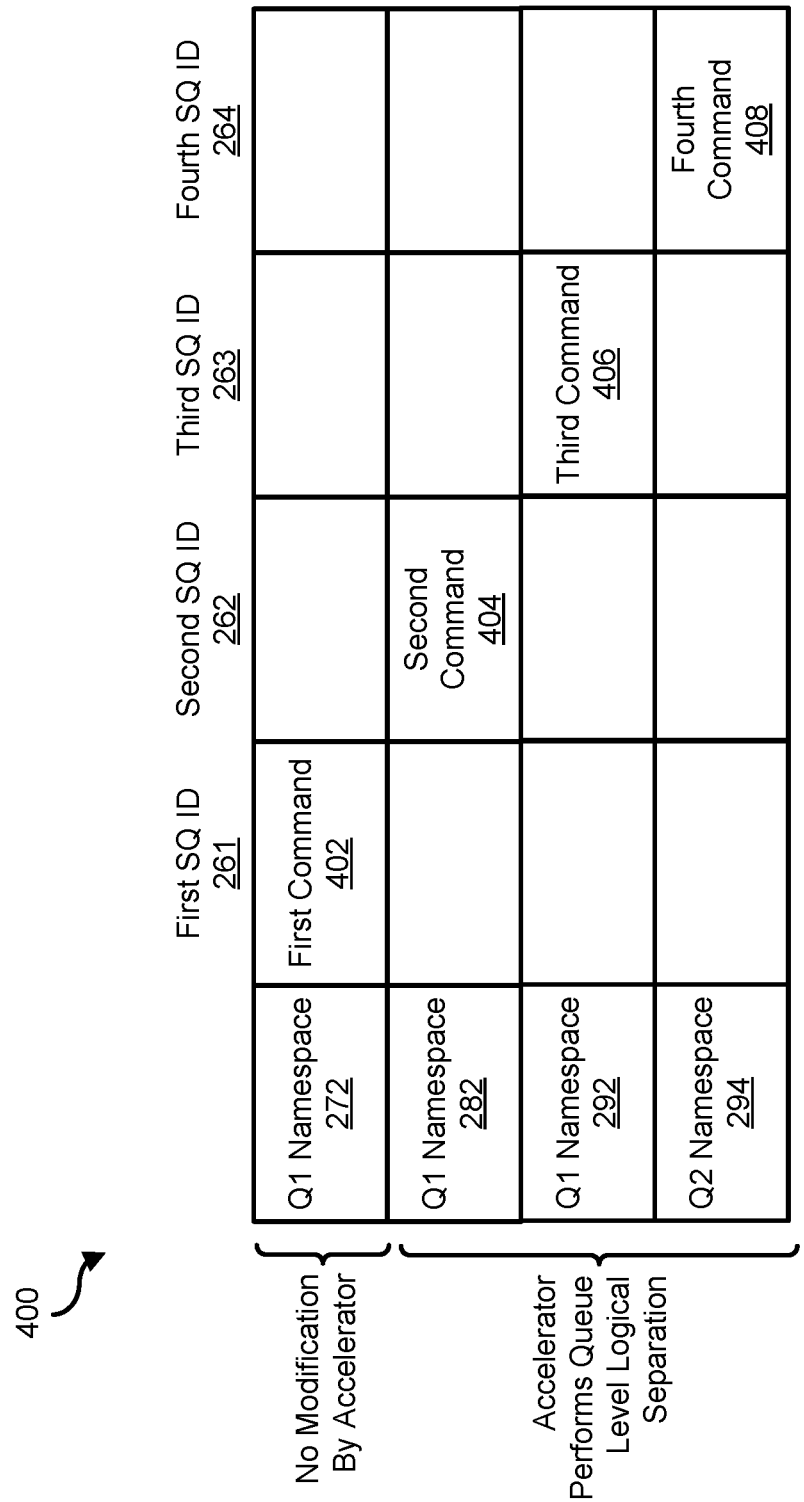
FIG. 4 is a table showing a mapping of commands as configured by a processor, according to an embodiment of the present disclosure.

FIG. 4 shows a command mapping 400 that includes the commands and corresponding queues that may process each command. The command mapping 400 shows written commands 402, 404, 406, and 408 on corresponding submission queue slots in the system memory. The first command 402 is stored in the first SQ ID 261 and is directed to the first queue namespace 272 of the PCIe device 270. The second command 404 is stored in the second SQ ID 261 and is directed to the second queue namespace 282 of the PCIe device 280, and so on. In an embodiment, the FPGA 140 is configured to perform queue level logical separations with regard to the second command 404, third command 406, and fourth command 408. However, the FPGA may not perform any modifications with regard to the mapping of the first command 402 that targets the namespace 272.

Figure 5:
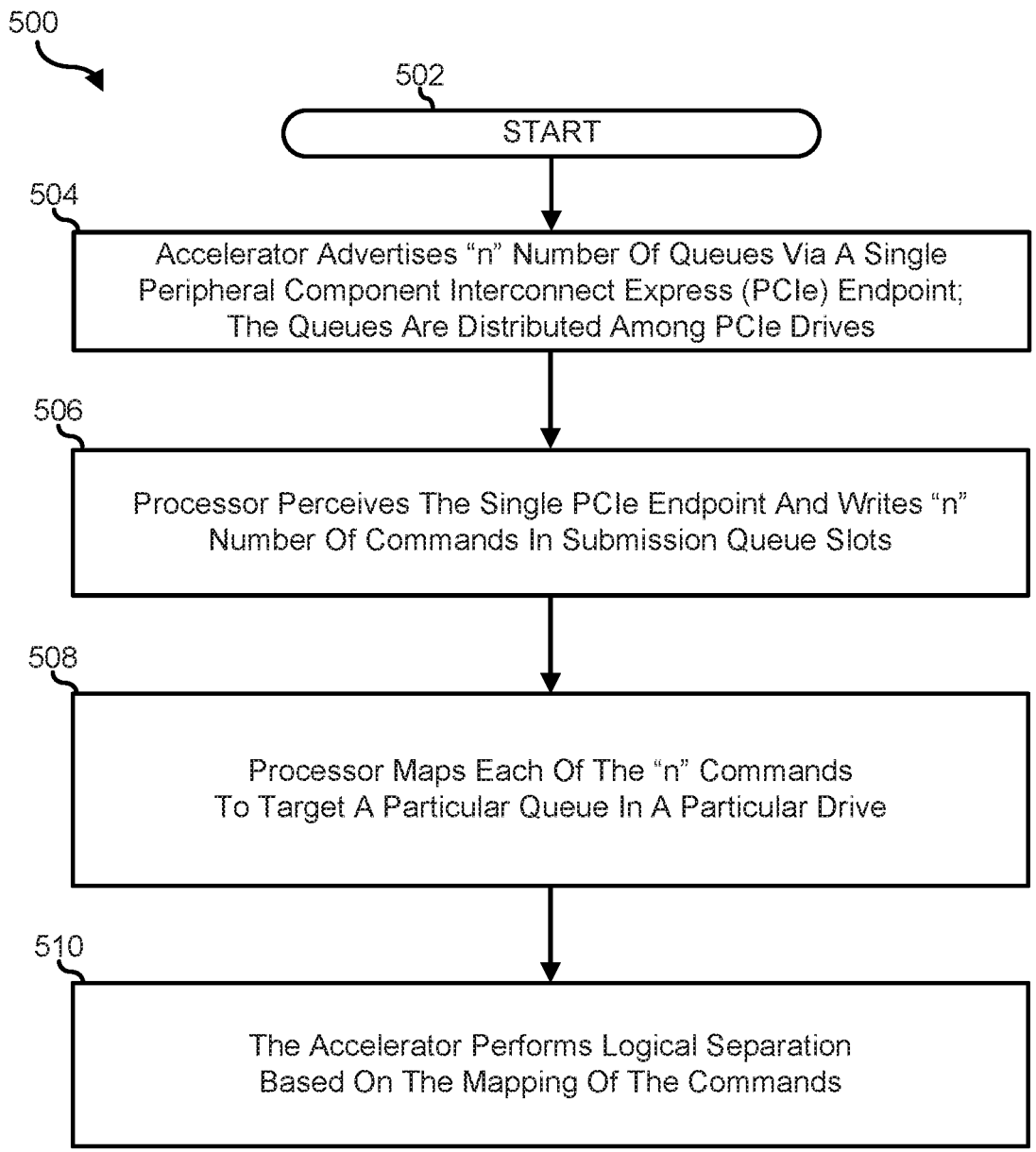
FIG. 5 is a flow chart showing a method of reducing latency in the information handling system by configuring the FPGA to advertise multiple queues using a single PCIe endpoint and to observe the queue level logical separation when acting as a host to the PCIe devices, according to an embodiment of the present disclosure.

FIG. 5 shows a method 500 of reducing latency during I/0 transaction operations in an information handling system, starting at block 502. At block 504, the FPGA 140 advertises "n" number of queues through the host virtual endpoint 216 that is used as the single PCIe endpoint. At block 506, the processor 102 perceives the use of the single PCIe endpoint and writes "n" commands in submission queue slots. At block 508, the processor 102 maps each command in the "n" commands to target a particular queue in a particular drive. At block 510, the FPGA 140 acts as a host to the PCIe devices and facilitates logical separation of each submission queue slot based on the mapping of the commands.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor; and
an accelerator coupled to the processor, the accelerator configured to:
advertise, via a single peripheral component interconnect express (PCIe) endpoint, to the processor a plurality of queues from different drives, wherein the processor is configured to write a set of commands and to map each command to target a particular one of the queues;
receive the mapped commands through the single PCIe endpoint and
perform a queue level logical separation for the mapped command to be processed by the target queue.

2. The information handling system of claim 1, wherein the advertising of the queues includes sending a namespace associated with each one of the queues.

3. The information handling system of claim 2, wherein the namespace includes a namespace label that describes a physical address of the drive that supports the queue, a namespace address of the queue, a range of logical block addresses of the queue, and a number of queues that are supported by the drive.

4. The information handling system of claim 2, wherein the processor perceives the single PCIe endpoint and uses the associated namespace to map each command.

5. The information handling system of claim 2, wherein the queue level logical separation includes modifying a register address of a submission queue slot where the mapped command is written to match the namespace of the target queue.

6. The information handling system of claim 1, wherein the accelerator further includes:
   a mapper configured to: intercept a doorbell for the mapped command that is written in a submission queue slot; perform the queue level logical separation to match a register address of the submission queues slot with a namespace address of the target queue; and
   facilitate transmission of the doorbell to the target queue.

7. The information handling system of claim 6, wherein a command fetch from the target queue is intercepted by the mapper and the mapper performs the queue level logical separation to adjust attributes of the command fetch based on the attributes of the mapped command.

8. The information handling system of claim 6, wherein a completion status from the target queue is intercepted by the mapper and the mapper performs the queue level logical separation to adjust attributes of the completion status based on the attributes of the mapped command.

9. The information handling system of claim 6 further comprising a system memory, wherein a command response from the system memory is intercepted by a management central processing unit (CPU), and the management CPU performs the queue level logical separation to adjust attributes of the command response based on the attributes of the mapped command.

10. A method, comprising:
   advertising, by an accelerator via a single peripheral component interconnect express (PCIe) endpoint, a plurality of queues from different drives;
   writing, by a processor, a plurality of commands in submission queue slots, wherein each command is mapped to target a particular one of the queues;
   receiving the mapped commands through the single PCIe endpoint; and
   performing a logical separation of the queues based on the mapping of commands.

11. The method of claim 10, wherein the advertising includes sending a namespace associated with each one of the queues.

12. The method of claim 11, wherein the namespace includes a namespace label that describes a physical address of the drive that supports the queue, a namespace address of the queue, a range of logical block addresses of the queue, and a number of queues that are supported by the drive.

13. The method of claim 11, wherein the processor perceives the single PCIe endpoint and uses the associated namespace to map each command.

14. The method of claim 11, wherein the performing of the logical separation by a mapper includes modifying a register address of the submission queue slot where the mapped command is written to match a namespace address of the target queue.

15. The method of claim 14 further including: intercepting of a command fetch from the target queue and performing the logical separation to adjust attributes of the command fetch based on the attributes of the mapped command.

16. An information handling system, comprising:
   a processor; and
   an accelerator coupled to the processor, the accelerator configured to:
   advertise, via a single peripheral component interconnect express (PCIe) endpoint, to the processor namespaces associated with a plurality of queues from different drives, wherein the processor is configured to write commands and to map each command based on the namespace associated with a particular one of the queues;
   receive the mapped commands through the single PCIe endpoint; and
   perform a queue level logical separation for the mapped commands to be processed by the advertised queues.

17. The information handling system of claim 16, wherein the namespace includes a namespace label that describes a physical address of the drive that supports the queue, a namespace address of the queue, a range of logical block addresses of the queue, and a number of queues that are supported by the drive.

18. The information handling system of claim 16, wherein the accelerator further includes:
   a mapper configured to: intercept a doorbell for the mapped command that is written in a submission queue slot; perform the queue level logical separation to match a register address of the submission queues slot with a namespace address of a target queue; and
   facilitate transmission of the doorbell to the target queue.

19. The information handling system of claim 18, wherein a command fetch from the target queue is intercepted by the mapper and the mapper performs the queue level logical separation to adjust attributes of the command fetch based on the attributes of the mapped command.

20. The information handling system of claim 18, wherein a completion status from the target queue is intercepted by the mapper and the mapper performs the queue level logical separation to adjust attributes of the completion status based on the attributes of the mapped command.

* * * * *